Jan. 9, 1945.　　O. CULLMAN ET AL　　2,367,100
SPROCKET MILLING MACHINE
Filed Feb. 6, 1943　　3 Sheets-Sheet 1
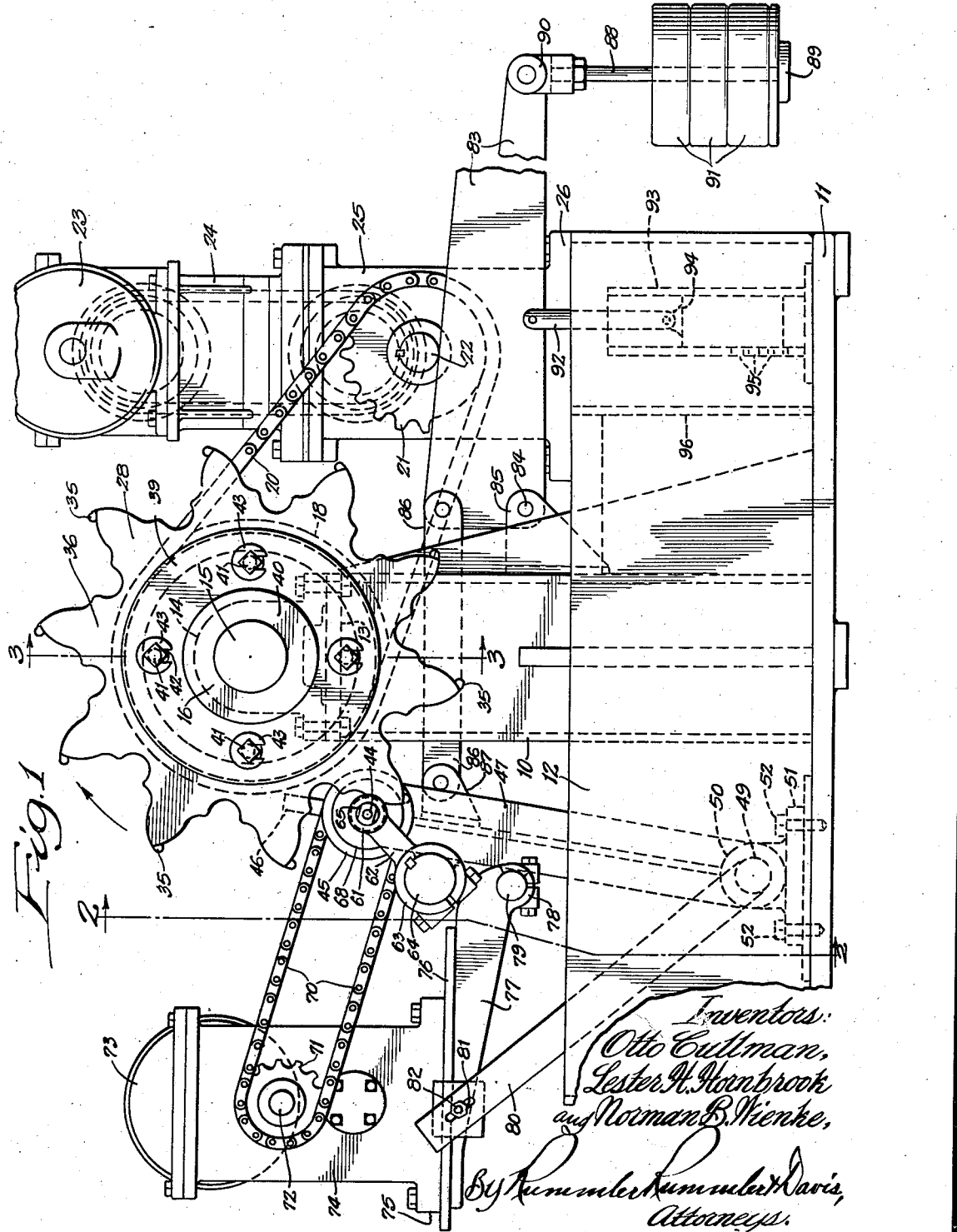

Jan. 9, 1945.  O. CULLMAN ET AL  2,367,100
SPROCKET MILLING MACHINE
Filed Feb. 6, 1943  3 Sheets-Sheet 2
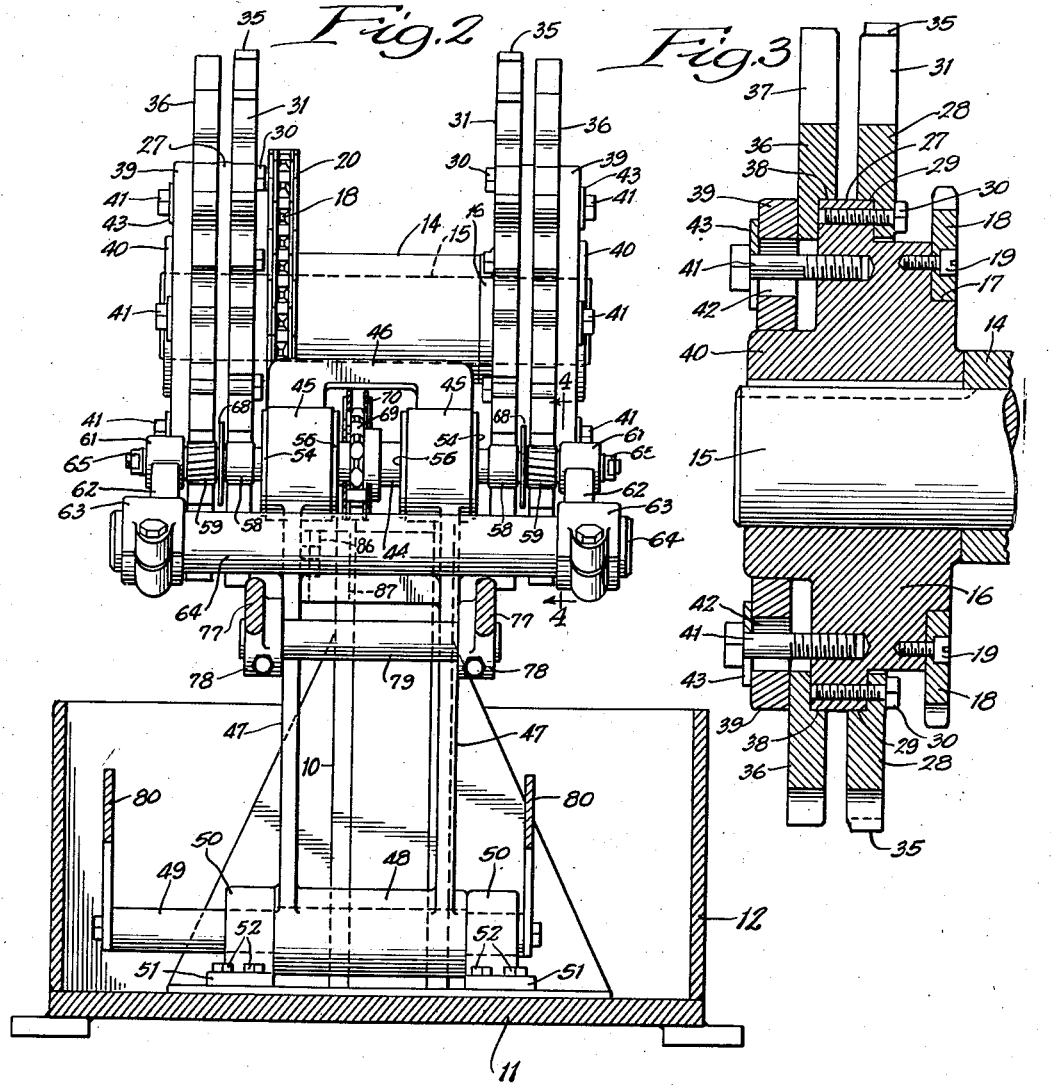
Inventors:
Otto Cullman,
Lester H. Hornbrook
and Norman B. Wienke,
By Kummler Kummler & Davis
Attorneys.

Jan. 9, 1945.   O. CULLMAN ET AL   2,367,100
SPROCKET MILLING MACHINE
Filed Feb. 6, 1943   3 Sheets-Sheet 3
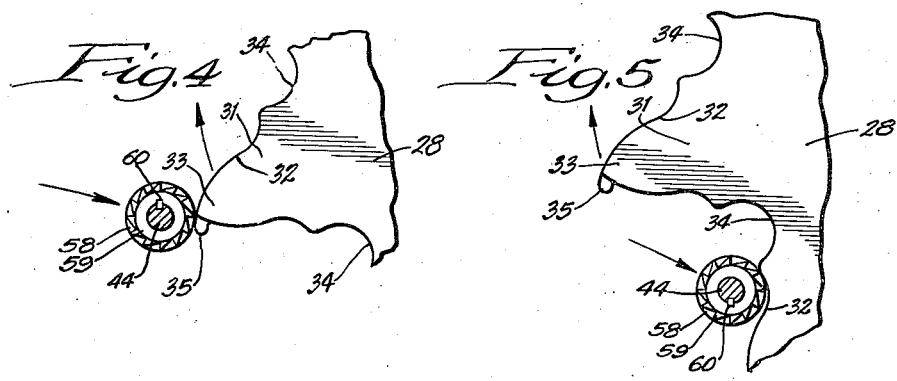
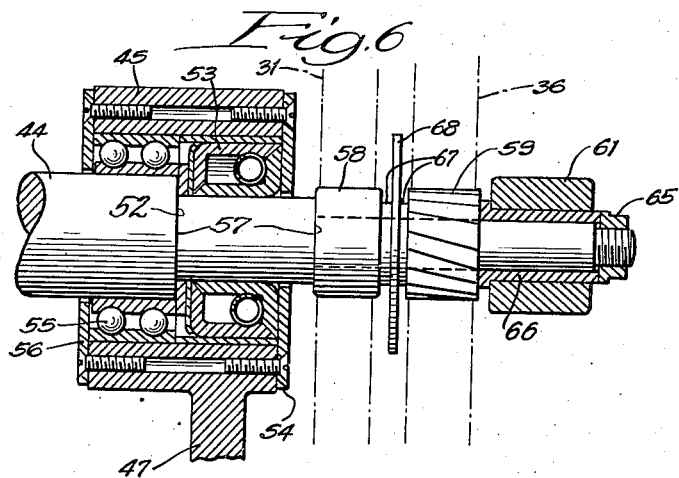
Inventors:
Otto Cullman,
Lester H. Hornbrook
and Norman B. Wienke,
By Rummler Rummler & Davis,
Attorneys.

Patented Jan. 9, 1945

2,367,100

UNITED STATES PATENT OFFICE 2,367,100

SPROCKET MILLING MACHINE

Otto Cullman, Lester H. Hornbrook, and Norman B. Wienke, Chicago, Ill., assignors to Cullman Wheel Co., Chicago, Ill., a corporation of Illinois Application February 6, 1943, Serial No. 474,930

8 Claims. (Cl. 90—2)

The present invention relates to improvements in milling machines, and it has particular reference to an automatic apparatus for milling to proper shape and dimensions the sprocket wheels used in cooperation with the link-belts on the caterpillar treads of military tanks, tractors, and the like.

It is the principal object of this invention to provide a highly efficient apparatus which will rapidly, automatically, and dependably perform its required functions. Another object of this invention is to simplify the construction of an apparatus of the character contemplated herein, and to improve the operation of such apparatus.

Still another object is to provide a machine which will accurately mill the working edges of a plurality of sprockets during a single cycle of operation.

A further object is to provide a machine wherein at least two sprocket blanks in reversed positions are operated upon simultaneously, with the milling tools working upon corresponding edges of the teeth of the two blanks.

Further objects are to provide a milling machine wherein the milling tool will operate upon the leading edge of a sprocket tooth, and after completing the work on said edge will be automatically shifted to the leading edge of the succeeding sprocket tooth, and this operation continued until the leading edges of the entire series of teeth of a sprocket have been finished; to provide that at the end of each milling operation upon a tooth the milling tool will be bodily moved and rapidly pass from the tip or crest of the addendum of said tooth to an inner portion of the adjacent root groove without contacting the trailing edge of the tooth from which said tool has been disengaged; to provide improved escapement means controlled by the template for transition of the tool from one tooth to the next without engagement with the trailing edge of the tooth and for retarding of the bodily movement of the tool; and to provide improved means for readily mounting and dismounting the work blanks.

A preferred embodiment of this invention is hereinafter described and shown in the accompanying drawings in which:

Figure 1 is a longitudinal side elevation of an apparatus such as contemplated herein for automatically milling the teeth of sprockets.

Fig. 2 is a vertical transverse sectional view of the same, taken on line 2—2 of Figure 1.

Fig. 3 is a fragmental vertical section taken axially through the template and blank supporting arbor, the view being taken along the plane of line 3—3 on Figure 1, looking in the direction of the arrows and drawn to a larger scale.

Fig. 4 is a diagrammatic view showing travel of the milling tool being moved bodily from the tip portion of a sprocket tooth upon which it has been operating.

Fig. 5 is another diagrammatic view showing further rotative movement of the template and corresponding sprocket tooth and also showing the path of bodily movement of the milling tool into position to start operation upon the leading edge of the next tooth.

Fig. 6 is an enlarged detail, partly in longitudinal section, of the milling tool, its guide roller, and the mounting of the arbor therefor.

In the form shown, the instrumentalities for holding the work are mounted upon a support or pedestal 10 which arises from the central portion of a base 11 which also provides the bottom of a tank or reservoir defined by upright walls 12. At the top of the pedestal there is a horizontal shelf 13 which provides a support for a heavy bearing block 14 that is bolted to said shelf and provided with a horizontal bore for journalling the main arbor 15. Both ends of the arbor project beyond the bearing block as will be seen in Figures 2 and 3 and these extended ends of the arbor have the work-carrying members keyed to them so that said members will rotate simultaneously in the same direction. Each of these work-carrying members consists of a body 16 axially bored to fit an end of the arbor 15.

One of these members 16, as shown in Figures 2 and 3, is provided with an annular seat 17 in which a comparatively large sprocket 18 is secured by means of bolts 19. The sprocket 18 drives the work-carrying members and the arbor 15, and it is connected by a link belt 20 with a sprocket 21 keyed to the adjacent end portion of a rotatable drive shaft 22. Suitable means are employed for driving the shaft 22 to turn the arbor 15 and work-carrying members 16 at the proper speed so that each tooth of a blank will remain in coactive relation to the milling tool the proper length of time for the tool to complete an operation upon the leading edge of the tooth.

In Figure 1 an electric motor 23 is shown mounted upon the housing 24 of a suitable speed-reducing mechanism, which in turn is supported upon the casing 25 of a transmission gearing having operative connection with the drive shaft 22. The casing 25 of the transmission mechanism is provided with basal flanges or lugs 26 bolted to the upper portion of the tank walls 12 at one end thereof.

The enlarged view shown in Figure 3 is a vertical section of the work-supporting wheel member at the left end of the arbor 15 in Figure 2, and since both wheel members are of the same construction (with the exception of the sprocket 18), this detailed description thereof will be confined to Figure 3 and the same reference characters will identify similar parts on the other wheel member. The annular outer edge of the wheel body 16 is provided with a circumferential rib 27 which is adapted to provide a mounting for the template or pattern 28 which is of ring-shape and may be one of the finished pieces of work. A rabbet 29 around the edge of its central opening permits the template to be seated upon the corner portion of the rib 27 nearest the ring gear 18 and to be secured to said rib by means of bolts 30 which pass through the template and are screwed into threaded openings in the adjacent side of said rib. The circumferential contour of the template 28 conforms with the finished shape of the work piece, and in the form shown, is provided with a plurality of radially projecting teeth 31 having edges 32 formed in compound curves as suggested in Figures 1, 4 and 5 wherein it will be seen that the teeth have generally triangular shapes disposed with the tips 33 outermost and with root grooves or recesses 34 between these teeth. The template rotates clockwise in Figure 1, as indicated by the arrows, and the crests 33 of its teeth 31 are provided with projecting lugs or lips 35 which function in the manner of an escapement for the milling tools to clear the trailing edge of each tooth. This will be more fully explained in a subsequent portion of this description.

The work piece upon which the milling tool operates may be a ring-shaped disc 36 similar in its general outline to the pattern or template 28. The work item shown by way of example in the drawings has a rabbet 38 formed around the edge of its central opening. This permits its being seated upon the corner portion of the rib 27 on the opposite side thereof from the template where it is securely mounted by special clamping instrumentalities to permit the ready removal of the work piece 36 at the end of each cycle of operation of the apparatus.

The devices for attaching the work piece to the wheel rib 27 preferably consist of an annular clamp disc 39 which has a central opening of such diameter that it may be slipped upon the extending hub 40 of the wheel member 16, and the overall diameter of said clamp disc 39 is sufficient to have an outer marginal portion to overlap the inner marginal portion of the work piece 36 in the manner shown in detail in Figure 3. Bolts 41 pass through apertures 42 in the clamp-disc and screw into threaded holes in the adjacent side face of the wheel member 16, and it will be noted that the diameters of the apertures 42 are greater than the widest portions of the heads of bolts 41 so that the clamp-disc 39 may be readily taken off the hub 40 of the wheel member without removing the bolts from the threaded holes in the side of said wheel member.

Heavy U-shaped washers 43 are interposed between the heads of the bolts 41 and the adjacent outer face of the clamp-disc 39, said washers being of a diameter which is larger than the apertures 42 so that said washers will engage the face of the clamp-disc around the apertures 42 when the heads of the bolts are tightened against the outer faces of said washers. Thus it will be seen that when it is desired to remove the work piece, the bolts may merely be loosened, and after the U-shaped washers 43 have been displaced from the shanks of the bolts, the clamp-disc may then be removed and the work piece 36 also unseated from the wheel member 16. The reverse of this operation takes place when another work piece is substituted for the piece which has been removed.

The milling tools, together with the guide rollers which cooperate with the templates 28, are suitably mounted upon a rotatable spindle 44 which is journaled in spaced bearings 45 which are mounted for bodily movement in a path that intersects the path of the teeth on the work in the plane of its rotation as the guide rollers are following the contours of the templates 28. The bearings 45 are a portion of a rocking frame comprising a U-shaped bridge piece 46 and spaced supporting arms 47 which are also connected at their lower ends by means of a hollow connector 48. A rock-shaft 49 which passes through connector 48 is mounted in spaced bearings 50 which have flanges 51 secured to the base 11 by means of bolts which securely anchor the rocking frame-structure in a manner to prescribe the bodily movement of the upper portion of said frame with respect to the work pieces and templates during the operation of the apparatus.

The rotatable spindle 44 is reduced in diameter within the bearing bosses 45 to provide shoulders 52 against which oil and dust seal devices 53 are abutted by means of closure plates 54, and back of said spindle shoulders there are anti-friction devices 55 that are interposed between the bosses and the adjacent portions of the spindle and are maintained in position by closure plates 56. This arrangement is illustrated in detail in Figure 6. The end portions of the spindle 44 project beyond the bearing bosses 45 and are reduced in diameter to provide shoulders 57 near said bosses, which shoulders 57 act as abutments for the guide rollers 58 which are rotatable on the spindle independently of the rotation of the latter. Beyond the rollers 58 the spindle has the milling tools or cutters 59 secured to it by keys 60 (Figure 4) so that said tools will be rotated at the same speed as the spindle 44. It will be seen, by reference to Figures 2 and 6, that the guide rollers 58 and cutters 59 are disposed upon the rotating spindle 44 in spaced relation to each other and they are in planar alinement respectively with the templates 28 and the work-pieces 36. The spindle 44, since it is rotatably mounted on the rocking frame of which the arms 47 are a part, is adapted through the medium of the guide rollers 58 to follow the contour of the templates and in so doing will cause the cutters or milling tools 59 to engage and shape the edges of the work pieces in an exact duplication of the work-shaping contours of the templates 28.

The spindle 44 has its extremities rotatably journaled in bearings 61 at the adjacent ends of removable brace arms 62 having split collars 63 that are firmly clamped to the adjacent ends of a horizontal bar 64 of the rocking frame. Beyond the bearings 61 the ends of the spindle 44 are reduced and threaded to receive nuts 65 to bear against the ends of the bushings 66 which prevent axial movement of the spindle. The milling tools 59 and their adjacent guide rollers 58 are separated from each other on the spindle 44 by pairs of ring spacers 67, and suitable baffle discs 68 are mounted between the ring spacers in order to prevent chips from the work from striking the guide rollers 58 and their respective templates and possibly causing inaccurate cuts.

The spindle 44 is rotated at high speed by means of wheel 69, a link belt 70, wheel 71 and a driving shaft 72. An electric motor 73 drives the shaft 72 through a transmission mechanism enclosed in the housing 74. The base 75 of this housing is securely bolted to the top of a platform 76 carried by a pair of spaced arms 77 extending horizontally away from the rocking frame arms 47. The inner ends of these arms 77 have split embossments 78 whereby said arms may be rigidly clamped to the end portions of a horizontal cross-member 79. The horizontal bar 64 and the cross-member 79 are disposed, the former above the latter, as shown in Figures 1 and 2, and they are welded or otherwise permanently secured to adjacent portions of the rocker arms 47 and thereby assist in strengthening the swinging frame which carries the operating spindle.

In order to firmly maintain the platform in desired relation to the other parts of the swinging frame suitable oblique struts 80 are provided which have their lower ends secured to the fulcrum or rock-shaft 49 and have their upper end portions provided with elongated slots 81 to receive lateral studs 82 by which the platform may be locked in desired relation to the swinging frame. By releasing the clamp bosses 78 and the securing devices for the studs, the platform may be swung upon the bar 79 as a fulcrum in order to tighten or loosen the belt 70 between the toothed wheels 69 and 71.

Although the work-carrying arbor 15 is rotated at a relatively slow speed, the tool-carrying spindle 44 is rotated at a very high speed, and said spindle, together with its movable support or carrier, is constantly urged in the direction of the work by suitable novel instrumentalities which are clearly shown in Figure 1.

An elongated bell-crank element or arm 83 is fulcrumed on a pin 84 carried by a bracket 85 that is secured to and projects from a portion of the pedestal 10 above the plane of the top of the tank 12, and the upper arm of this bell-crank lever 83 is pivotally connected to one end of a horizontal link 86 that extends past the pedestal 10 and has its other end pivotally connected to a bracket 87 on the rocking frame between the rocker arms 47. The long arm of the bell-crank lever 84 extends beyond the end of the tank 12 where it is provided with a pendant weight-link 88 which has a supporting disc 89 at its lower end and has its bifurcated upper end 90 pivoted to the end of the bell-crank arm 84. The weights 91 which are carried by the link 88 are of preponderating size in order to considerably over-balance the tendency of the rocker-frame, the motor 73 and the platform 76 to pull the tool-carrying spindle away from the work, and this over-balancing weight is also sufficient to urge the milling tools and the guide rollers firmly against their respective work pieces and templates.

The bell-crank lever 83 is provided intermediate the weighted end and the fulcrum bracket 85 with a depending pitman rod 92 that extends into a dash-pot 93 where its lower end is pivotally connected to a piston 94 having reciprocable sliding movement in said dash-pot. At the lower portion of the wall of the dash-pot 93 there is a series of openings 95 past which the inner end of the piston is adapted to move and successively close said openings to act as a brake and gradually slow down or retard the movement of the bell-crank arm 83 in a downward direction. The dash-pot is preferably disposed within a receptacle or chamber 96 at the end of the tank 12 and a sufficient level of liquid is maintained therein to keep the dash-pot properly supplied. It will be understood that when the piston 94 begins to move downward from an upper position above the uppermost port or opening 95, the liquid in the dash-pot will be forced through all of said openings and the movement of the piston will be faster than after some of the openings have been closed by said piston, and as a consequence, the lower the piston travels down in the dash-pot the slower will be the downward movement of the weighted bell-crank arm 83; thus retarding the downward motion of the bell-crank arm and avoiding shock as the cutter engages the work.

The pull of the weight 91 forces the rocking frame in the direction of the main work arbor causing the guide roller 58 and the milling tools 59 to bear firmly against the respective templates 28 and work pieces 36, and while this main arbor is slowly rotating in a clockwise direction (Figure 1) the rollers will follow the contour of the leading edges of the teeth on the templates 28 and the milling tools will correspondingly cut and shape the leading edge of the tooth being formed on the work piece or blank 36. Upon reaching the crest of a template tooth, the guide roller will continue in contact with the trailing lug 35 on the template tooth and will hold the milling tool 59 in a position where it is out of engagement with the work piece and this disengagement will continue until the guide roller leaves the end of said lug 35. In the meantime, the main arbor has continued to rotate the template and work piece tooth, which has just been cut, in an upward arc to a position so that when the roller leaves the control lug 35 the rocking frame which carries the spindle will rapidly swing upon its fulcrum 48, due to the action of the weight 91, until the roller and the cutters have reached the root groove or recess 34 between the teeth, and during this movement the rollers and cutters will be inactive upon the template and the work piece. The start of this swinging movement of the rocking frame and the operating spindle 44 will be rapid, but as the rollers and cutters approach the root groove 34, the swinging movement will have been slowed down because of the fact that the piston 94, which controls the movement of the bell-crank arm 83, will have reached a lower position in the dash-pot where it has begun to close the openings 95 which reduces the discharge of the liquid therethrough. The guide rollers and cutters then are in position to begin operation upon the leading edge of the next tooth.

This mode of operation will continue from each tooth to the next succeeding tooth in an automatic manner until the leading edge of the last tooth of the sprocket has been cut. The work pieces are then removed and remounted in reversed position upon the opposite end of the arbor 15, so that the previous trailing edges of the teeth of the sprocket then become the leading edges, and the cycle of operation is started with the cutting taking place upon the then leading edges of the teeth, and continues until the final tooth has been formed.

It is to be observed that the axes of the cutter spindle and the work arbor are parallel and that the path of the bodily movement of the cutters is linear and intersects the radius of the tooth that is being surfaced at an acute angle so that the cutters properly follow the template due to the rotation of the latter. When the template and work have made one complete revolution, the work is remounted in reversed position on the opposite end of the arbor and is completely finished at the end of the next complete revolution of the arbor.

Although but one specific embodiment of the invention is herein shown and described, it will be understood that numerous details may be altered or omitted without departing from the spirit of the invention as defined by the following claims.

We claim:

1. A milling machine, comprising an arbor, a template on said arbor having sprocket teeth, means for fixing a toothed sprocket blank in tooth-registering rotative relation to said template, driving means for rotating said template, a spindle journalled on an axis parallel with said arbor and having a guide wheel and rotary cutter thereon respectively alined with said template and blank, a carrier for moving said spindle in a path disposed across the path of the teeth on said template in the plane of rotation thereof, driving means for rotating said spindle, and means yieldingly urging said spindle toward said template, said template having extensions on the trailing sides of its teeth to cause said cutter to pass clear of the trailing sides of the teeth on such blank.

2. A milling machine, comprising a frame, an arbor mounted on said frame, a template on said arbor having sprocket teeth, means for fixing a toothed sprocket blank in tooth-registering rotative relation to said template, driving means for rotating said template, a spindle journalled on an axis parallel with said arbor and having a guide wheel and rotary cutter thereon respectively alined with said template and blank, a carrier pivotally mounted on said frame on an axis parallel with said arbor, for moving said spindle in a path disposed across the path of the teeth on said template in the plane of rotation thereof, driving means for rotating said spindle, and a lever fulcrumed on said frame, being linked to said carriage and counterweighted to normally urge said spindle toward said template.

3. A milling machine, comprising a frame, an arbor mounted on said frame, a template on said arbor having sprocket teeth, means for fixing a toothed sprocket blank in tooth-registering rotative relation to said template, driving means for rotating said template, a spindle journalled on an axis parallel with said arbor and having a guide wheel and rotary cutter thereon respectively alined with said template and blank, a carrier pivotally mounted on said frame on an axis parallel with said arbor for moving said spindle in a path disposed across the path of the teeth on said template in the plane of rotation thereof, driving means for rotating said spindle, a lever fulcrumed on said frame, being linked to said carriage and counterweighted to normally urge said spindle toward said template, and a dashpot acting between said lever and frame to control the movement of said carriage and prevent shock to said cutter as it passes from one tooth to the next on said blank.

4. A milling machine for cutting sprocket teeth, comprising a rotatable template, means for holding a work piece fixed with respect to said template, a tool adapted to operate upon said work piece, means for bodily moving said tool with respect to said template, a portion of said bodily movement being an accelerated motion of the tool towards the root of the sprocket teeth while inactive with respect to the work piece, and means adapted to retard said accelerated motion prior to reengagement of the tool with the work piece.

5. A milling machine for cutting sprocket teeth embodying a rotatable template, means for holding a work piece fixed with respect to said template, a tool adapted to operate upon said work piece, guide means coacting with said template to guide said tool, carrier means for bodily moving said tool under control of said guide means and template, means for causing the tool to leave said work piece and move with accelerated bodily motion towards a root groove to position said tool to operate upon a portion of another tooth, and means for retarding such accelerated bodily motion of said tool at a predetermined position.

6. A milling machine, comprising a support, a template rotatable on said support, a work piece secured for rotation with said template, a rock frame fulcrumed below said template for swinging movement towards and away from said support, a rotatable guide member on said rock frame positioned to engage said template, a rotatable milling tool on said rock frame positioned to engage said work piece, driving means mounted on said rock frame for actuating said milling tool, a bell-crank operatively connected to said rock frame, and a weight on said bell-crank adapted to urge said rock frame in a direction to normally maintain said guide member and said milling tool engaged with said template and said work piece.

7. A milling machine comprising a support, an arbor rotatably mounted thereon, a template carried by said arbor, a work piece carried by said arbor, a rock frame adapted for swinging movement towards and away from said support, a rotatable guide member on said spindle positioned to engage said template, a rotatable milling tool on said rock frame positioned to engage said work piece, driving means on said rock frame for actuating said milling tool, a bell-crank operatively connected to said rock frame, a weight on said bell-crank to urge said rock frame in a direction to normally maintain said guide member and said milling tool engaged with said template and said work piece, and differentially acting braking means controlling the movement of said bell-crank.

8. In a milling machine, a rotatable arbor, a disc-shaped template fixed on said arbor, said template provided with a plurality of radially disposed projections upon its margin, the sides of said projections providing leading and trailing edges during rotation of said arbor, trailing lugs at the outer portions of said projections, means for mounting a work piece in fixed relation to said template for rotation therewith, a rotatable cutter in position to engage the leading edges of said work piece, means normally urging said cutter towards said work piece, and a guide for said cutter normally in active relation to the leading edges of said template projections, said guide adapted upon engagement with said lugs to cause said cutter to escape the successive trailing edges of said work piece projections.

OTTO CULLMAN.
LESTER H. HORNBROOK.
NORMAN B. WIENKE.